(12) United States Patent
Schimmer et al.

(10) Patent No.: US 7,649,466 B2
(45) Date of Patent: *Jan. 19, 2010

(54) LOCALIZATION SYSTEM AND METHOD FOR LOCALIZING OBJECTS OR ANIMALS USING SUCH A LOCALIZATION SYSTEM

(75) Inventors: Martijn Schimmer, Rotterdam (NL); George Johannes Ferdinandus Blom, Rijsbergen (NL)

(73) Assignee: Eyeon Trust B.V., Rijsbergen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/552,547

(22) PCT Filed: Apr. 8, 2004

(86) PCT No.: PCT/NL2004/000234

§ 371 (c)(1),
(2), (4) Date: Jul. 20, 2006

(87) PCT Pub. No.: WO2004/092773

PCT Pub. Date: Oct. 28, 2004

(65) Prior Publication Data

US 2007/0171063 A1   Jul. 26, 2007

(30) Foreign Application Priority Data

Apr. 15, 2003 (NL) .................................. 1023183
Aug. 29, 2003 (NL) .................................. 1024190

(51) Int. Cl.
*G08B 23/00* (2006.01)
*G08B 13/14* (2006.01)
*G08B 21/00* (2006.01)
*A63B 61/00* (2006.01)
*A63B 43/00* (2006.01)
*A63B 43/06* (2006.01)
*G01S 13/08* (2006.01)
*G01S 3/02* (2006.01)

(52) U.S. Cl. .............. 340/573.4; 340/573.3; 340/572.1; 340/572.8; 340/572.9; 340/686.1; 473/467; 473/353; 473/570; 342/127; 342/450

(58) Field of Classification Search ............... 340/573.4
See application file for complete search history.

(56) References Cited

U.S. PATENT DOCUMENTS

| | | | |
|---|---|---|---|
| 5,245,317 A * | 9/1993 | Chidley et al. ............... 340/571 |
| 5,976,038 A | 11/1999 | Orenstein et al. |
| 6,084,513 A * | 7/2000 | Stoffer ..................... 340/572.2 |
| 6,373,508 B1 | 4/2002 | Moengen |
| 6,466,125 B1 * | 10/2002 | Richards et al. .......... 340/573.4 |
| 6,469,628 B1 * | 10/2002 | Richards et al. .......... 340/573.3 |

(Continued)

FOREIGN PATENT DOCUMENTS

NL         1023183 C    10/2004

(Continued)

*Primary Examiner*—Daniel Wu
*Assistant Examiner*—Jack Wang
(74) *Attorney, Agent, or Firm*—The Webb Law Firm

(57) ABSTRACT

In particular situations it may be desirable to follow, trace or otherwise localize specific (groups of) objects or animals, in particular people. The invention relates to a localization system. The invention also relates to a method for localizing objects or animals using such a localization system.

15 Claims, 3 Drawing Sheets

U.S. PATENT DOCUMENTS

| | | |
|---|---|---|
| 6,489,893 B1 * | 12/2002 | Richards et al. .......... 340/573.4 |
| 6,501,393 B1 * | 12/2002 | Richards et al. ............. 340/993 |
| 6,552,661 B1 * | 4/2003 | Lastinger et al. ......... 340/572.1 |
| 6,617,962 B1 * | 9/2003 | Horwitz et al. ............ 340/10.4 |
| 2003/0001726 A1 * | 1/2003 | Moore ...................... 340/10.3 |
| 2003/0142691 A1 * | 7/2003 | Hartmann ................... 370/442 |
| 2003/0198271 A1 * | 10/2003 | Matveev ...................... 372/92 |

FOREIGN PATENT DOCUMENTS

| | | |
|---|---|---|
| WO | 9953339 | 10/1999 |

* cited by examiner

LOCALIZATION SYSTEM AND METHOD FOR LOCALIZING OBJECTS OR ANIMALS USING SUCH A LOCALIZATION SYSTEM

BACKGROUND OF THE INVENTION

1) Field of the Invention

The invention relates to a localization system. The invention also relates to a method for localizing objects or animals using such a localization system.

2) Description of the Prior Art

In particular situations it may be desirable to follow, trace or otherwise localize specific (groups of) objects or animals, in particular people. When determined objects go missing, such as for instance vehicles, jewellery, articles of sports equipment, or other types of possibly valuable products, localization of these objects may be desired, for instance to enable return of these objects to their rightful owner. In addition, it may also be desired to track down or follow particular animals, with humans as species. For instance in the case children are missing in a determined area, such as an amusement park, or in the case of persons missing while under suspicion of a crime, it is generally of great importance to track down these missing persons as soon as possible. It may also be desired to monitor (a group of) animals, for instance from a scientific or safety viewpoint. Diverse prior art techniques are known for localizing objects or animals. In the prior art it is for instance known to provide animals with a chip, which chip can be traced using radio waves. The animal can thus be localized. A drawback of this technique is however that it is generally relatively difficult—because of the relatively low accuracy and limited range of the known system—to localize the chip, and therefore the animal, using the known system.

The invention has for its object to provide an improved system with which objects or animals, in particular persons, can be localized in relatively simple and accurate manner.

SUMMARY OF THE INVENTION

The invention provides for this purpose a localization system, comprising: means for generating an energy field, wherein the energy field is formed by one or more pulse streams, at least one disrupting means for locally disrupting the energy field, detection means for detecting the local disruption of the energy field, and a control unit coupled to the detection means for localizing the disrupting means on the basis of the detected local disruption. By means of the system according to the invention it is possible to localize rapidly, effectively and precisely an object or animal provided with a disrupting means in an energy field at any random point in time. The position of the object or animal can herein be determined both two-dimensionally and three-dimensionally, depending on the application. The generation of the energy field in the system according to the invention takes place via pulse streams by means of Ultra-WideBand (UWB) technology. UWB allows the transmission of relatively large quantities of data per unit of time (between about 50 and about 1000 megabit per second, but more particularly up to about 600 megabit per second). As relatively small energy surges, the pulses per se contain no data, but by transmitting the pulses a fraction sooner or later than a basic pattern it does however become possible to transmit digital data at very high speed. In the system according to the invention an energy field formed by pulse streams is intentionally applied, since other types of energy field, for instance WiFi networks, have diverse drawbacks. Use is thus no longer made of electromagnetic (sinusoidal) waves with a determined scarce ether frequency, but use is made of electromagnetic pulses which are transmitted in unobstructed and imperceptible manner via a unique maximal bandwidth (frequency spectrum). Owing to the relatively broad frequency spectrum the energy per frequency is relatively low, generally even much lower than the noise threshold, whereby the UWB signal will not disrupt other types of electromagnetic energy flows, or hardly so. Interference will therefore not occur when pulse streams are applied. In addition, the maximum transfer speed of data via pulses is many times greater than the transfer speed of data via electromagnetic radiation. The pulse streams are preferably made up of ultra-short pulses following closely on each other, in order to further increase the transfer speed of data. The means for generating the energy field and the detection means are preferably integrated with each other. The generated energy field can cover a relatively small as well as a relatively large area. It is thus possible for instance to have only a predetermined (small-scale) area, such as a petrol station, an amusement park, a nature reserve and so on covered by the energy field, in order to enable tracing of objects or animals situated therein. It is however also possible to generate an energy field which extends over relatively large areas, and has a for instance regional, national or even global nature. Using the localization system according to the invention, objects and animals, in particular people, who are missing or being searched for can be traced and tracked down in relatively simple, efficient and precise manner.

In a preferred embodiment, the means for generating the energy field are adapted to transmit pulse beams of a plurality of pulse streams, wherein at least two pulse streams of a pulse beam are oriented at least substantially parallel to each other. By dividing the pulse signal into a plurality of parallel pulse streams, the pulses forming part of the pulse streams do not have to follow very closely on each other to increase the transfer speed. This has the advantage that the detection means can be given a less sensitive, and therefore generally less expensive form. In a particular preferred embodiment, each pulse beam comprises nine pulse streams, which pulse streams are oriented at least substantially parallel to each other. It is in general particularly advantageous to make up each pulse beam from nine pulse streams oriented parallel to each other since this considerably enhances the reliability of the system. The pulses are thus transmitted at a sufficient interval from each other, whereby error correction systems are generally no longer necessary.

In a preferred embodiment the disrupting means is arranged on at least one object. These objects can be very diverse in nature, but are usually valuable objects such as for instance jewellery, carriers of confidential information, vehicles and so on. In addition, it is also possible to arrange the disrupting means on or in animals. It is also possible to provide persons with a disrupting means, whereby persons can be localized. In order to guarantee sufficient privacy, the localizing of persons being searched for will generally only be possible under strict conditions.

In another preferred embodiment, the disrupting means is adapted to disrupt the energy field in unique manner. In the case that a plurality of objects or animals are placed in an energy field, the localization of each object or animal can take place individually, wherein the danger of confusion can be prevented. Each object or animal can thus be provided for instance with its own, unique disrupting means. In one embodiment it is even conceivable for each player of an outdoor sport, such as for instance football, tennis and (ice) hockey, to be provided with a unique disrupting means, whereby the (relative) position of the players can be determined at any random moment. For a comprehensive description of the localization of sports equipment, reference is made to the Netherlands patent specification NL 1023183 of applicant, the subject-matter of which is incorporated herein by reference.

As already described above, the system according to the invention comprises a disrupting means which is adapted to locally disrupt the energy field. Local disruption of the pulse streams, preferably pulse beams, must be interpreted broadly. In a preferred embodiment, the disrupting means is adapted to reflect the pulse streams. There therefore occurs prima facie only reflection of the pulse streams. The direction of propagation of the pulse streams is then changed (disrupted), which can be detected by the detection means. The detection of reflection of pulse streams can also be designated as a radar-related technology. In another preferred embodiment, the disrupting means is adapted to influence the pulse streams. In influencing of the pulse streams the relative orientation of the pulses relative to the basic pattern is specifically changed (disrupted), which can also be determined by the detection means.

The disrupting means is preferably formed by a chip. The chip is generally relatively small and can usually be inserted in simple manner in or on the object or animal. The chip is preferably provided with a quantity of electrical energy in order to enable influencing of the pulse pattern of the energy field.

In another preferred embodiment, the disrupting means is formed by a coating on the object or animal. A coating can generally be applied to the relevant object or animal in relatively simple and inexpensive manner. The coating is generally particularly adapted to reflect pulse streams. In addition to a chip and a coating, the disrupting means can also be differently designed. The disrupting means can thus also be formed by for instance at least one material part from which the object is manufactured.

The system is preferably provided with visual means communicating with the control unit for displaying the location of the detected object or animal. The visual means can herein be physically connected to the control unit, but are generally positioned at a distance from the control unit. The communication between the control unit and the visual means takes place wirelessly, preferably via electromagnetic radiation, for instance via a WiFi network. Less stringent technical requirements are usually set for the transmission of data from the control unit to the visual means. In another preferred embodiment, the communication between the control unit and the visual means also takes place wirelessly, however via pulse streams. The visual means can for instance be formed by, or form part of a portable device, which can preferably be hand-held by a user. Non-limitative examples hereof can be: a PDA, an XDA and a WDA.

The invention also relates to a method for localizing objects or animals, comprising the steps of: A) generating an energy field, wherein the energy field is formed by one or more pulse streams, B) placing in the energy field at least one object or animal provided with at least one disrupting means for locally disrupting the energy field, C) detecting the local disruption of the energy field, and D) localizing the object or animal on the basis of the detected local disruption. Objects or animals can thus be localized in the energy field in relatively efficient, precise and rapid manner. Further advantages of the method according to the invention have already been described above.

In a preferred embodiment of the method according to the invention, the method is provided with a step E) comprising of visualizing the location of the object or animal after localizing the object or animal on the basis of the detected local disruption as according to step D). Through visualizing of the object or animal a person can quickly and clearly determine the position of the relevant object or animal in an energy field.

In yet another preferred embodiment, a person provided with at least one disrupting means is placed in the energy field, while step B) is being performed, to locally disrupt the energy field. Persons, in particular children, can thus be traced relatively quickly and accurately in a determined area such as for instance an amusement park, city, nature reserve and so on.

BRIEF DESCRIPTION OF THE DRAWINGS

The invention is elucidated on the basis of non-limitative embodiments shown in the following figures, wherein.

DETAILED DESCRIPTION OF THE PREFERRED EMBODIMENTS

Figure 1:
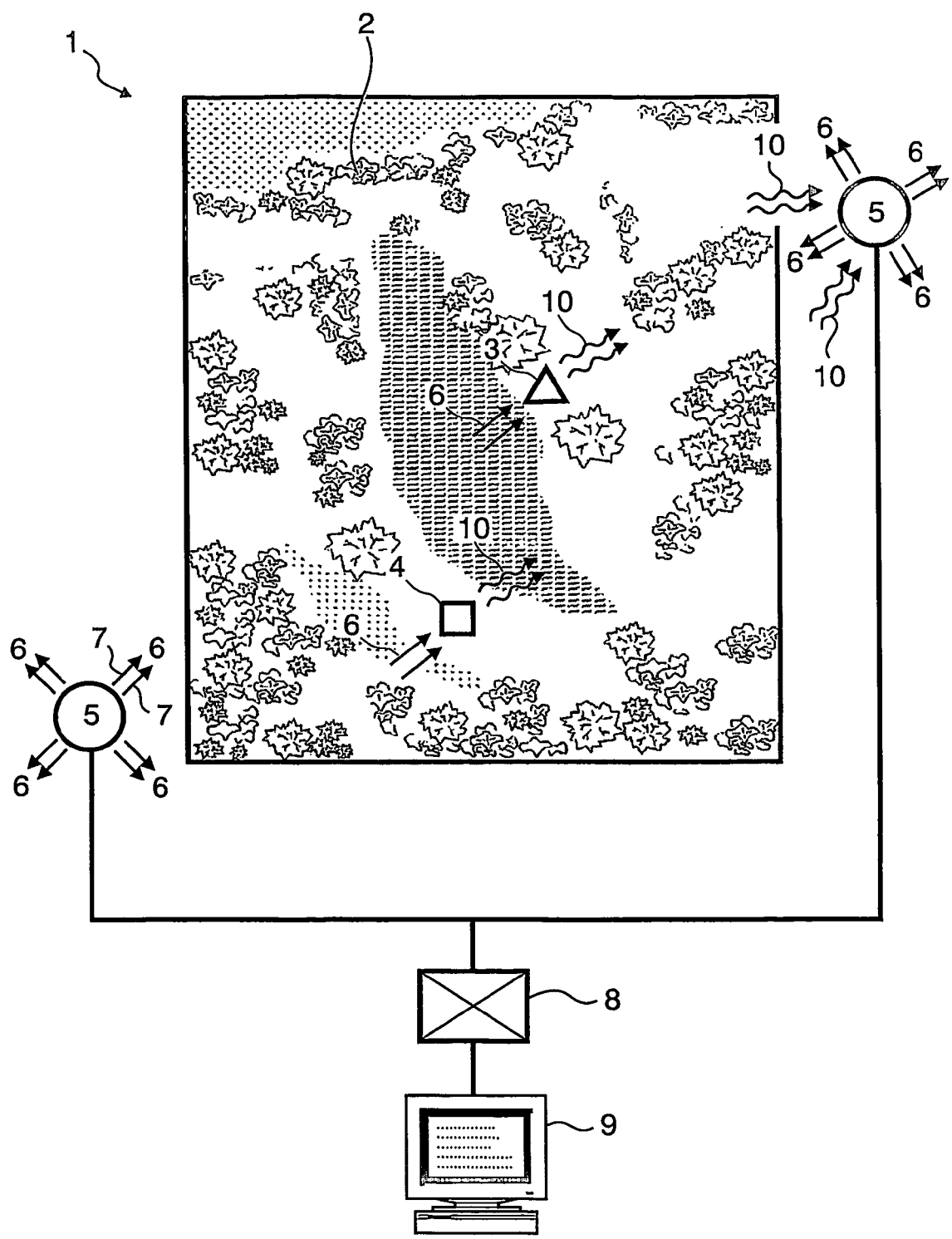
FIG. 1 shows a schematic view of a first preferred embodiment of a system according to the invention.

FIG. 1 shows a schematic view of a first preferred embodiment of a system 1 according to the invention. FIG. 1 shows a top view of a nature reserve 2 in which the system 1 is incorporated. System 1 is adapted to localize specific animals 3 and persons 4 in nature reserve 2. System 1 comprises for this purpose a plurality of transmitter/receiver units 5 for transmitting respectively receiving pulse beams 6. In this embodiment the pulse beams 6 are made up of two pulse streams 7 oriented at least substantially parallel to each other. The entirety of pulse beams 6 forms an energy field covering the whole nature reserve 2. The transmitter/receiver units are mutually coupled and are further coupled to a control unit 8. Control unit 8 is adapted for communication with each of the transmitter/receiver units 5. Control unit 8 is herein coupled to a screen 9. The animals 3 and persons 4 present in nature reserve 2 are each provided with a unique chip (not shown) for locally disrupting the pulse beams 6 of the generated energy field. For the sake of clarity the disrupted pulse beams 10 are shown in unique manner in FIG. 1 following disruption by the chip. Transmitter/receiver units 5 are adapted to receive these influenced pulse beams 10, on the basis of which the exact location of the relevant animal 3 or person 4 can be established using control unit 8. Data relating hereto can further be displayed on screen 9. Using the shown system 1 according to the invention, both animals 3 and persons 4 can be traced relatively rapidly and precisely. From a for instance scientific, criminological or safety viewpoint, such a relatively rapid and precise determination can be of great importance.

Figure 2:
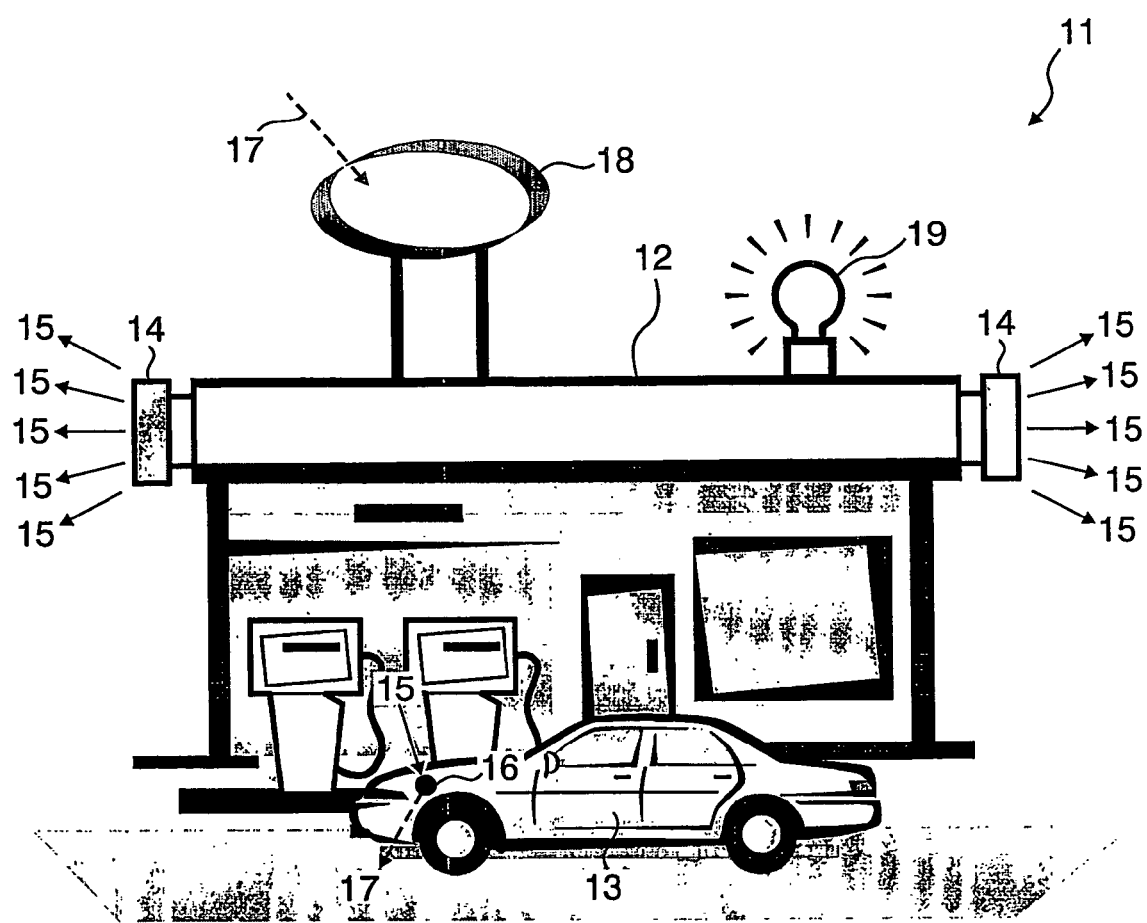
FIG. 2 shows a schematic view of a second preferred embodiment of a system according to the invention.

FIG. 2 shows a schematic view of a second preferred embodiment of a system 11 according to the invention. In the shown embodiment the system 11 is implemented in a petrol station 12 for motor vehicles 13. System 11 now comprises transmitting means 14 for generating an energy field based on pulse streams 15. Motor vehicle 13 is provided with a unique chip 16 which functions as means for disrupting the generated energy field. The pulse streams 15 incident upon the unique chip 16 are transformed in unique manner by chip 16 into modified (mutated) pulse streams 17. The pulse streams 17 can be picked up by receiving means 18 connected to filling station 12. Receiving means 18 are coupled to a control unit (not shown) incorporated in a network, using which the presence of motor vehicle 13 at filling station 12 can be determined. The system 11 according to the invention can therefore be utilized very readily for tracing particularly stolen motor vehicles 13 that are being looked for. When determined (sought) motor vehicles 13 are traced, an alarm 19 can optionally be activated. This can also be a silent alarm, so that the local authorities can be alerted without this being noticed. In this manner it is possible to minimize or at least reduce the number of unsolved motor vehicle thefts. In this context (practically) every filling station 12 in a particular area is preferably provided with the system 11 according to the invention.

Figure 3:
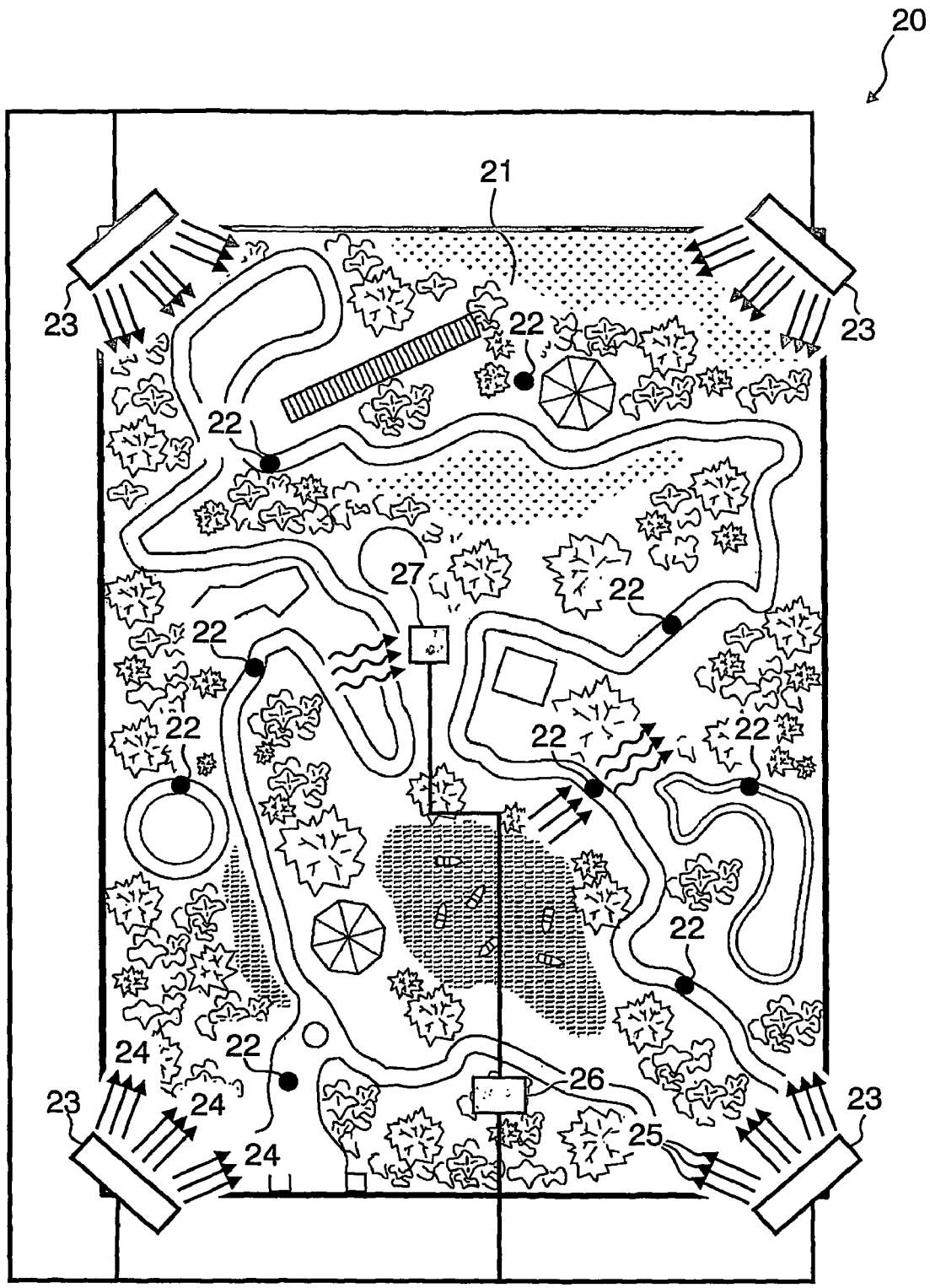
FIG. 3 shows a schematic view of a third preferred embodiment of a system according to the invention.

FIG. 3 shows a schematic view of a third preferred embodiment of a system 20 according to the invention. In the shown embodiment the system 20 is applied in an amusement park 21. System 20 is deployed here particularly for localizing children 22, in particular lost children. In every corner of amusement park 21 there is stationed a pulse generator 23 for generating an energy field. Pulse generator 23 is adapted to generate pulse beams 24, wherein each pulse beam 24 consists of three pulse streams 25 oriented at least substantially parallel to each other. The generated energy field covers practically) the entire amusement park 21. At an entrance 26 of amusement park 21 children 22 are provided with a unique sticker (not shown), wherein the sticker is adapted to disrupt the energy field in unique manner. The sticker is herein provided for instance with a coating, a chip and/or a material layer for disrupting the energy field in unique manner. At entrance 26 the data of the child and the unique sticker are also mutually coupled and entered into a database The disruption of the energy field can be observed by a central receiver 27. Both the pulse generators 23 and central receiver 27 are coupled to a control system which can be controlled from the entrance 26 of amusement park 21. In the case that a child 22 gets lost, the parents for instance can report this at entrance 26, or at another reporting location (not shown) in amusement park 21, whereby the lost child 22 can be directly and precisely localized via the database, using system 20 according to the invention. A child 22 being lost in the amusement park 21 for a long time can thus be prevented, or at least countered.

It will be apparent that the invention is not limited to the exemplary embodiments shown and described here, but that within the scope of the appended claims a large number of variants are possible, which will be self-evident to the skilled person in this field.

The invention claimed is:

1. A localization system, comprising:
  means for generating an electromagnetic energy field within the Ultra-Wideband (UWB), wherein the electromagnetic energy field is formed by one or more pulse streams,
  at least one disrupting means for locally disrupting the electromagnetic energy field,
  detecting means for detecting the local disruption of the electromagnetic energy field, and
  a control unit coupled to the detecting means for localizing the disrupting means on the basis of the detected local disruption,
  wherein the means for generating the electromagnetic energy field are adapted to transmit pulse beams of a plurality of pulse streams, wherein each pulse beam comprises nine pulse streams, which pulse streams are oriented at least substantially parallel to each other.

2. The localization system as claimed in claim 1, wherein the disrupting means is arranged on at least one object.

3. The localization system as claimed in claim 1, wherein the disrupting means is arranged on an animal.

4. The localization system as claimed in claim 3, wherein the disrupting means is arranged on a person.

5. The localization system as claimed in claim 1, wherein the disrupting means is adapted to disrupt the electromagnetic energy field in a manner that distinguishes it from other disrupting means in the system.

6. The localization system as claimed in claim 1, wherein the disrupting means is adapted to reflect the pulse streams.

7. The localization system as claimed in claim 1, wherein the disrupting means is adapted to influence the pulse streams.

8. The localization system as claimed in claim 1, wherein the disrupting means is formed by a chip.

9. The localization system as claimed in claim 1, wherein the disrupting means is formed by a coating.

10. The localization system as claimed in claim 1, wherein the localization system is provided with visual means communicating with the control unit for displaying the location of the detected disrupting means.

11. The localization system as claimed in claim 10, wherein the communication between the control unit and the visual means takes place wirelessly via electromagnetic radiation.

12. The localization system as claimed in claim 10, wherein the communication between the control unit and the visual means takes place wirelessly via pulse streams.

13. A method for localizing objects or animals, comprising the steps of:
  A) generating an electromagnetic energy field within the Ultra-Wideband (UWB), wherein the electromaanetic energy field is formed by one or more pulse beams, wherein each pulse beam comprises nine pulse streams oriented at least substantially parallel to each other,
  B) placing in the electromagnetic energy field at least one object or animal provided with at least one disrupting means for locally disrupting the electromagnetic energy field,
  C) detecting the local disruption of the electromagnetic energy field, and
  D) localizing the object or animal on the basis of the detected local disruption.

14. The method as claimed in claim 13, wherein the method is provided with a step E) comprising of visualizing the location of the object or animal after localizing the object or animal on the basis of the detected local disruption as according to step D).

15. The method as claimed in claim 13, wherein while step B) is being performed a person provided with at least one disrupting means is placed in the electromagnetic energy field to locally disrupt the energy field.

* * * * *

UNITED STATES PATENT AND TRADEMARK OFFICE
CERTIFICATE OF CORRECTION

| | | |
|---|---|---|
| PATENT NO. | : 7,649,466 B2 | Page 1 of 1 |
| APPLICATION NO. | : 10/552547 | |
| DATED | : January 19, 2010 | |
| INVENTOR(S) | : Schimmer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 42 days.

Title Page of the Patent, Item (56) References Cited, U.S. PATENT DOCUMENTS, add the following:

-- 6,504,483 B1    7/2003    Richards et al.    .........340/573.3 --

Column 6, Line 38, Claim 13, "electromaanetic" should read -- electromagnetic --

Signed and Sealed this

Twenty-eighth Day of September, 2010

David J. Kappos
*Director of the United States Patent and Trademark Office*